United States Patent
Durik et al.

(10) Patent No.: US 10,695,856 B2
(45) Date of Patent: Jun. 30, 2020

(54) SYSTEM AND METHOD FOR SHORT ARC WELDING

(71) Applicant: Illinois Tool Works Inc., Glenview, IL (US)

(72) Inventors: Justin M. Durik, Greenville, WI (US); Robert R. Davidson, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 656 days.

(21) Appl. No.: 15/288,534

(22) Filed: Oct. 7, 2016

(65) Prior Publication Data

US 2018/0099344 A1    Apr. 12, 2018

(51) Int. Cl.
| | |
|---|---|
| *B23K 9/095* | (2006.01) |
| *B23K 9/073* | (2006.01) |
| *B23K 9/09* | (2006.01) |
| *B23K 9/173* | (2006.01) |
| *B23K 9/10* | (2006.01) |

(52) U.S. Cl.
CPC ............ *B23K 9/095* (2013.01); *B23K 9/0732* (2013.01); *B23K 9/09* (2013.01); *B23K 9/092* (2013.01); *B23K 9/0953* (2013.01); *B23K 9/10* (2013.01); *B23K 9/173* (2013.01)

(58) Field of Classification Search
CPC ........ B23K 9/0732; B23K 9/09; B23K 9/092; B23K 9/095; B23K 9/0953; B23K 9/10; B23K 9/173
See application file for complete search history.

(56) References Cited

U.S. PATENT DOCUMENTS

| | | | |
|---|---|---|---|
| 6,087,626 A * | 7/2000 | Hutchison | B23K 9/091 219/130.01 |
| 6,326,591 B1 * | 12/2001 | Hutchinson | B23K 9/091 219/130.01 |
| 6,504,131 B1 | 1/2003 | Hayes | |
| 6,639,182 B2 | 10/2003 | Hayes | |
| 6,642,482 B2 | 11/2003 | Rappl et al. | |
| 6,670,579 B2 | 12/2003 | Davidson et al. | |
| 6,713,721 B2 | 3/2004 | Albrecht | |
| 6,747,247 B2 | 6/2004 | Holverson et al. | |
| 6,933,466 B2 * | 8/2005 | Hutchison | B23K 9/09 219/130.21 |

(Continued)

FOREIGN PATENT DOCUMENTS

| | | |
|---|---|---|
| CN | 103111732 | 5/2013 |
| EP | 0133448 | 2/1985 |
| WO | 2005051586 | 6/2005 |

OTHER PUBLICATIONS

International Search Report and the Written Opinion of the International Searching Authority, dated Feb. 5, 2018, European Patent Office 2280 HV Rijswijk Netherlands.

*Primary Examiner* — Ibrahime A Abraham
*Assistant Examiner* — Frederick F Calvetti
(74) *Attorney, Agent, or Firm* — George R. Corrigan

(57) ABSTRACT

A method and apparatus for short circuit welding is disclosed. They reduce the current prior to the short clearing by adjusting waveform parameters in response to past cycles. One or more parameter of the output is monitored and compared to one or more targets, and future waveform parameters are adjusted so that the monitored parameters are more likely to reach the one or more targets.

16 Claims, 7 Drawing Sheets

(56) References Cited

U.S. PATENT DOCUMENTS

| | | | |
|---|---|---|---|
| 9,233,431 B2 * | 1/2016 | Murakami | B23K 9/0953 |
| 2000/4022220 | 11/2004 | Hutchison et al. | |
| 2004/0222204 A1 * | 11/2004 | Hutchison | B23K 9/09 |
| | | | 219/130.21 |
| 2012/0061362 A1 | 3/2012 | Davidson et al. | |
| 2013/0264323 A1 * | 10/2013 | Daniel | B23K 9/093 |
| | | | 219/137 PS |
| 2014/0008342 A1 * | 1/2014 | Peters | B23K 9/092 |
| | | | 219/130.21 |
| 2014/0076858 A1 * | 3/2014 | Peters | B23K 9/164 |
| | | | 219/74 |
| 2014/0158669 A1 * | 6/2014 | Davidson | B23K 9/092 |
| | | | 219/130.5 |

* cited by examiner

SYSTEM AND METHOD FOR SHORT ARC WELDING

FIELD OF THE INVENTION

The present invention relates generally to the art of welding-type power supplies and providing welding type power. More specifically, it relates to a welding-type power supply and providing welding type power for short circuit welding.

BACKGROUND OF THE INVENTION

There are many known welding-type systems used to provide a welding-type output or welding-type power for many known applications. Welding-type system, as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith. Welding-type power or output, as used herein, refers to power suitable for welding, plasma cutting, induction heating, CAC-A and/or hot wire welding/preheating (including laser welding and laser cladding). Welding-type power circuit, as used herein, refers to power circuitry that receives an input power and provides welding-type power.

Examples of prior art welding-type systems include those described in Method of Designing and Manufacturing Welding-Type Power Supplies, Albrecht, filed Sep. 19, 2001, application Ser. No. 09/956,401, which issued on Mar. 30, 2004 as U.S. Pat. No. 6,713,721; Pendant Control for a Welding-Type System, L. Thomas Hayes, filed Sep. 19, 2001, application Ser. No. 09/956,502, which issued on Oct. 28, 2003 as U.S. Pat. No. 6,639,182; Welding-Type Power Supply With A State-Based Controller, Holverson et al., filed Sep. 19, 2001, application Ser. No. 09/956,548, which issued on Jun. 8, 2004 as U.S. Pat. No. 6,747,247; Welding-Type System With Network And Multiple Level Messaging Between Components, Davidson et al., filed Sep. 19, 2001, application Ser. No. 09/957,707, which issued on Dec. 30, 2003 as U.S. Pat. No. 6,670,579; Welding-Type Power Supply With Boot Loader, L. Thomas Hayes, filed Sep. 19, 2001, application Ser. No. 09/956,405, which issued on Jan. 7, 2003 as U.S. Pat. No. 6,504,131; Welding-Type System With Robot Calibration, Rappl et al., filed Sep. 19, 2001, application Ser. No. 09/956,501, which issued on Nov. 4, 2003 as U.S. Pat. Nos. 6,642,482; 6,087,626, Hutchison, et al., Jul. 11, 2000, entitled Method and Apparatus for Welding and United States Patent Publication 20120061362, entitled Method and Apparatus For Welding With Short Clearing Prediction. Each of these patents is hereby incorporated by reference.

Some such systems are used for short circuit (MIG) or short arc welding, a process where the arc alternates between a short state and arc state. A wire electrode is fed into the weldment by a wire feeder in the short circuit transfer welding process. It is consumed into the weldment via the series of alternating short circuit and arc events. This process is generally referred to as short arc welding, short circuit welding, or short circuit transfer welding. Generally, a welding machine used for short arc welding includes at least a power source, a controller and a wire feeder. A prior art short arc waveform from the Miller® RMD® process is shown in FIG. 1. The upper images show the wire, puddle and arc or short, and the lower graph shows the current command for the phases of one short arc cycle. The waveform begins with a wet phase 101 while the ball is wetting into the puddle. During a pinch phase 103 the ball begins to transfer to the puddle. During a clear phase 105 the transfer continues until the short is cleared. During a blink phase 107 the arc is reestablished. During a ball phase 109 the end of the wire melts and forms a ball, and during background phase 111 the ball continues melting and advances towards the puddle. Phases 101-105 are during the short, and phases 107-111 are during the arc.

The short circuit transfer welding process is cyclical. One cycle of the process, as described herein, begins with the beginning of a short circuit condition followed by a steady state arc condition, and is completed with the beginning of another short circuit condition. A typical cycle length is 10 msec. The electrode, and a portion of the base metal, are melted during the short circuit transfer welding process by current flowing through the electrode to the weldment. Generally, a portion of the wire material melts during the arc condition, and is transferred during the short condition.

The event of clearing the short, i.e., the transition from a short circuit to an arc, may be a most violent portion of the process and can produce spatter. The explosive nature of this event has been reduced, by lowering the magnitude of the current prior to or at the short clearing, thereby limiting the power density. Some prior art short arc systems sensed the clearing, and then lowered the current magnitude.

Better short arc systems, such as Miller® RMD®, predict the short clearing, so the current can be lowered prior to the clearing. The RMD® prediction includes monitoring the second derivative of power. The RMD® process is an improvement over standard short circuit MIG because it removes energy during the critical time of short circuit clearing. Reducing energy during the short clear reduces spatter generation, and minimizes the disturbance to the weld puddle. But, the energy cannot be reduced too low or there will not be sufficient energy to maintain the arc and grow the next molten ball of metal to be shorted in the puddle and deposited.

Even when the short is predicted by the RMD® process, it can be difficult to lower the current to a level that does not disturb the puddle or cause spatter because the current does not always reach the targeted or commanded short clear current in the brief time between the prediction of the short clearing, and when the short clearing occurs. Welder output inductors and cable inductance limit the rate of change of current. The inductance acts as an energy storage system to prevent sudden changes in current. The prediction of the short clear is often about 200-400 microseconds in advance of the clear. System inductances can delay the current from reaching its target for times significantly longer than the 200-400 microseconds from prediction to short clearing. Higher current levels means more energy gets stored in the inductance, and the delay in the response to a current command reduction is longer. The additional energy (from the actual current being higher than the commanded current) causes energy to be dissipated as the wire breaks in to an arc, resulting in more spatter and puddle disturbance than desired.

Accordingly, a welding type system that performs welding and includes a way to reduce the current before or when the short clears is desirable.

SUMMARY OF THE PRESENT INVENTION

According to a first aspect of the disclosure a method of controlling a short circuit welding process having alternating short states and arc states includes increasing the current while in the short state to a first short current magnitude. Then, the current is decreased from the first short current magnitude at a first decrease rate. The process transitions from the short state to the arc state at a transition current. An elapsed time to the transition and/or transition current magnitude (or another parameter) is monitored, and a function of the elapsed time (or other parameter) is compared to a desired value. The current in the arc state is increased to a peak arc current magnitude, and then decreased to a background current magnitude. The short state parameters of a subsequent short state and/or the arc state parameters of a subsequent arc state are adjusted, based on the comparisons made in one or more prior cycles, to effect a desired change in a subsequent short state transition current. This process is repeated.

According to a second aspect of the disclosure a short-circuit welding system provides a welding output comprised of a plurality of alternating short states and arc states. The current magnitude at which the output changes from a short state to an arc state is called the transition current. The system includes a power circuit (that can include a wire feeder), a feedback circuit, and a controller. The power circuit receives power and provides a welding output, and has at least one control input. The feedback circuit is connected to the power circuit and/or the system output, and has a feedback output that is responsive to the output current and/or output voltage. The controller has control outputs connected to the power circuit, and has a feedback input connected to the feedback circuit. The controller includes a short state module that provides one or more short state parameters, and an arc state module that provides a plurality of arc state parameters. The short state module includes a short state ramp module that commands an increasing current while in the short state until the current reaches a first short current magnitude, and then the short state ramp module commands a decreasing current from the first short current magnitude at a first decrease rate. The first decrease rate is set in response to at least one short state ramp module input. The short state module also includes an elapsed time monitoring module that monitors elapsed time to the transition and/or monitors the transition current. The plurality of short state parameters are responsive to the elapsed time monitoring module. The short state module includes a comparison module that compares the monitored elapsed time (or transition current) or functions thereof, to a target value. The short state module provides the short state parameters of a subsequent short state in response to the output of the comparison module. More than one prior cycle comparison can be used to set the short state parameters. The short state parameters are set to effect a desired change in the transition current of the subsequent short state.

According to a third aspect of the disclosure a method of controlling a short circuit welding process includes setting a heat target for at least a portion of a short state. Output parameters are monitored during the short state, and a measured heat is calculated from the measured output parameters. The measured heat (or a function thereof) is compared to a heat target, and one or more output parameters in a subsequent short state and/or a subsequent arc state are adjusted in response to the comparison. This process is repeated.

According to a fourth aspect of the disclosure a system for short circuit welding includes a power circuit (which can include a wire feeder), a feedback circuit, and a controller. The power circuit receive a power signal and provides a welding output, and has a control input. The feedback circuit is connected to the power circuit and/or the system output, and provides feedback responsive to output current and/or output voltage during the short state. The controller has control outputs connected to the power circuit and receives the feedback. The controller includes a short state module that provides one or more short state parameters, and an arc state module that provides a plurality of arc state parameters. The short state module includes a measured heat module that receives the feedback and provides a measured heat output of at least a portion of the short state. The short state module also includes a comparison module that compares a desired heat target and the measured heat output (or a function thereof). The short state module provides the plurality of short state parameters of a subsequent short state in response to the output of the comparison module from at least one past short state.

The short state parameters are adjusted, or the arc state parameters are adjusted, or both are adjusted in various alternatives.

The transition is predicted based on feedback from the output, and in response to the predicting, the current is decreased at a faster rate than the first decrease rate, in another alternative.

The function of the time (or other parameter) is responsive to the heat provided during at least one phase of the short state, and the desired value is responsive to a desired heat provided during the at least one phase of the short state in one embodiment.

Adjusting short state parameters of a subsequent short state includes increasing or decreasing a short state current magnitude to decrease or increase the time and heat in the subsequent short state, in various embodiments.

A transition prediction module receives a signal from the feedback circuit, and provides a prediction output to the short state ramp module in one alternative.

The comparison module receives and compares a signal that is indicative of the heat provided during at least one phase of the short state, and a signal indicative of a desired heat for that phase of the short state in another alternative.

A heat setting module is active for at least a portion of a short state in one embodiment.

A current magnitude in the subsequent short state is responsive to the comparison module in various embodiments.

Other principal features and advantages of will become apparent to those skilled in the art upon review of the following drawings, the detailed description and the appended claims.

Figure 1:
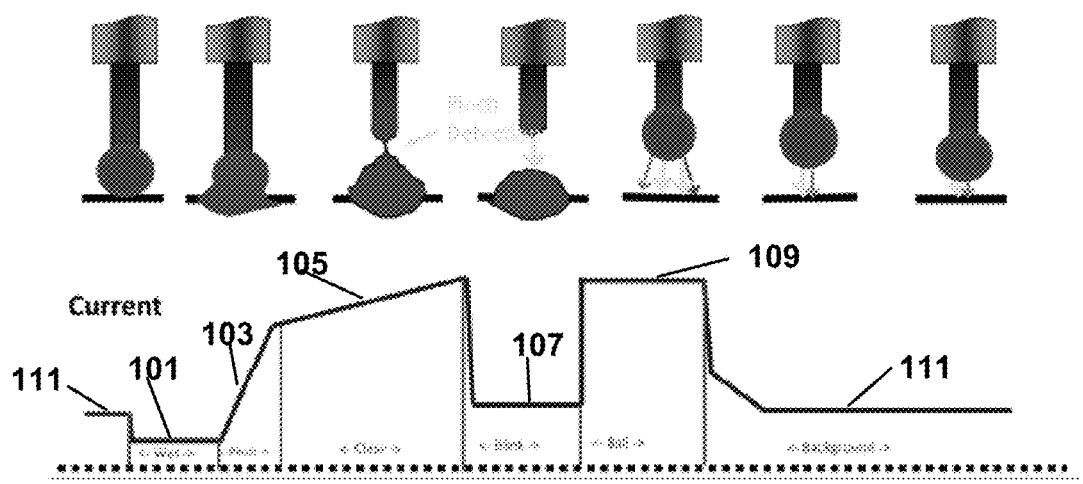
FIG. 1 shows the waveform for various phases of the prior art RMD® short arc process.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular system that provides particular waveforms, and particular algorithms using the RMD® process, it should be understood at the outset that the disclosure can also be implemented with other systems, other waveforms, using other algorithms, and for other processes.

Figure 2:
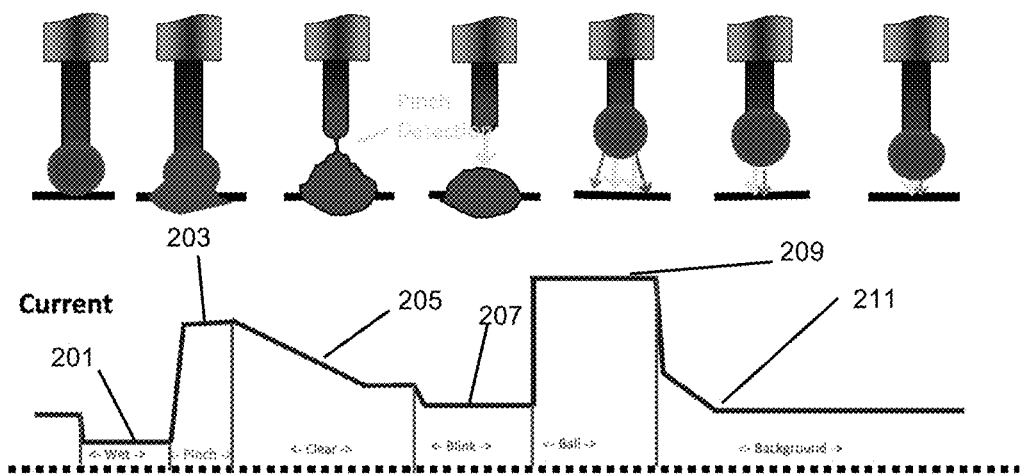
FIG. 2 shows a waveform for various phases of a short circuit waveform disclosed herein.

Generally the disclosure provides a way to reduce the current prior to the short clearing, resulting in less of a likelihood of spatter and puddle disturbance. The prior RMD® process is improved upon by having the pinch phase handle more of the short clear (by having a longer duration or greater current). The commanded waveform is shown in FIG. 2, and includes phases similar to that of the prior art. During the wet phase 201 the ball is wetting into the puddle. During the pinch phase 203 the ball begins to transfer to the puddle. The clear phase includes a first ramp down 205 and a plateau 206. During the blink phase 207 the arc is reestablished. During the ball phase 209 the end of the wire melts and forms a ball, and during the background phase 211 the ball continues melting and advances towards the puddle.

As shown in FIG. 2, the preferred embodiment provides that during the clear phase current is reduced (relative to the prior art) by ramp 205 to a low target current 207 for the short clear. A control loop adjusts the energy (current) to the waveform. The control loop targets a specific location in the waveform when the actual current should be low, for the short to clear. One embodiment provides for adjusting the pinch current up or down so that the short clears at the transition from clear ramp down 205 to clear target current 206. Alternatives includes adjusting the pinch current, pinch ramp, pinch time, clear ramp, clear current or any state prior to the actual short clear.

In the preferred embodiment the control loop adjusts parameter so that the short clears at a targeted location or time in the waveform, such as the time or location in the waveform where clear ramp 205 ends and clear target current 206 is reached (where the ramp ends and the flat portion of the waveform begins for the clear state). Current could be used as the monitored parameter by the control loop, but current is not linear at the junction of phases 205 and 206, thus controlling by current could be unstable without proper control. One embodiment uses heating, defined as Heating=Current*Current*Resistance*time. Where Current is the measured weld current, Resistance in the resistance of the wire and is assumed to be a constant (for control purposes any constant can be used, and 1 is an easy value to use) and Time is the rate of data acquisition (the actual data acquisition rate is a constant 50 microseconds, so any value can be used, and 1 is, again, an easy value). This simplifies the formula used in the control loop to simplify to: Heating=Heating+Current*Current. Thus, the heating to reach the desired short clear is calculated and used as the control loop target. The preferred embodiment uses heating to more accurately model the effect of the current on the location in the waveform at which the short clears. Alternatives such as a power or a sum of currents could be used.

Using the heating target, the control loop adjusts waveform parameters when the short clears other than at the desired junction of phases 205 and 206. The preferred embodiment provides that the energy prior to the short on the following cycle(s) is adjusted. A proportional and integral control loop is used in the preferred embodiment, although many alternatives exist to achieve similar results.

The control loop uses the following values: Proportional Error or Heating Error=Heating Target−Actual Heating at short clear and Integral Error or Heating Error Sum=Heating Error Sum+Heating Error. The error is then used to adjust some parameter that manipulates the energy of the waveform for the next cycle(s). Adjustment=(Heating Error*Proportional Gain)+(Heating Error Sum*Integral Gain) and Waveform Parameter=Waveform Parameter+Adjustment.

The preferred embodiment adjusts the pinch current in response to the heating error. If there is too much heating in the clear phase, the pinch current on future cycles is increased, which reduces the time in the clear phase in future cycles, and reduces heating in the clear phase in future cycles. If there is too little heating, the pinch current on future cycles is decreased. This increases the time in the clear phase in future cycles, and increase heating in future cycles.

Thus, rather than relying on predicting when the short will clear (as did the best prior art) the preferred embodiment monitors heat of past cycles to control when (in the waveform of the current cycle) the short will clears. The preferred embodiment helps puddle stability and reduces spatter because the current is relatively low for the clearing in most cycles. Additionally, because the preferred embodiment can control during the arc and short states, the control has a good response to changes in stick-out and disturbances in the puddle. The preferred embodiment also provides a softer and more consistent process with low current short clears, because the actual current can more closely follow the commanded current by using slower commanded current changes rather than the prior art rapid current changes.

Figure 3:
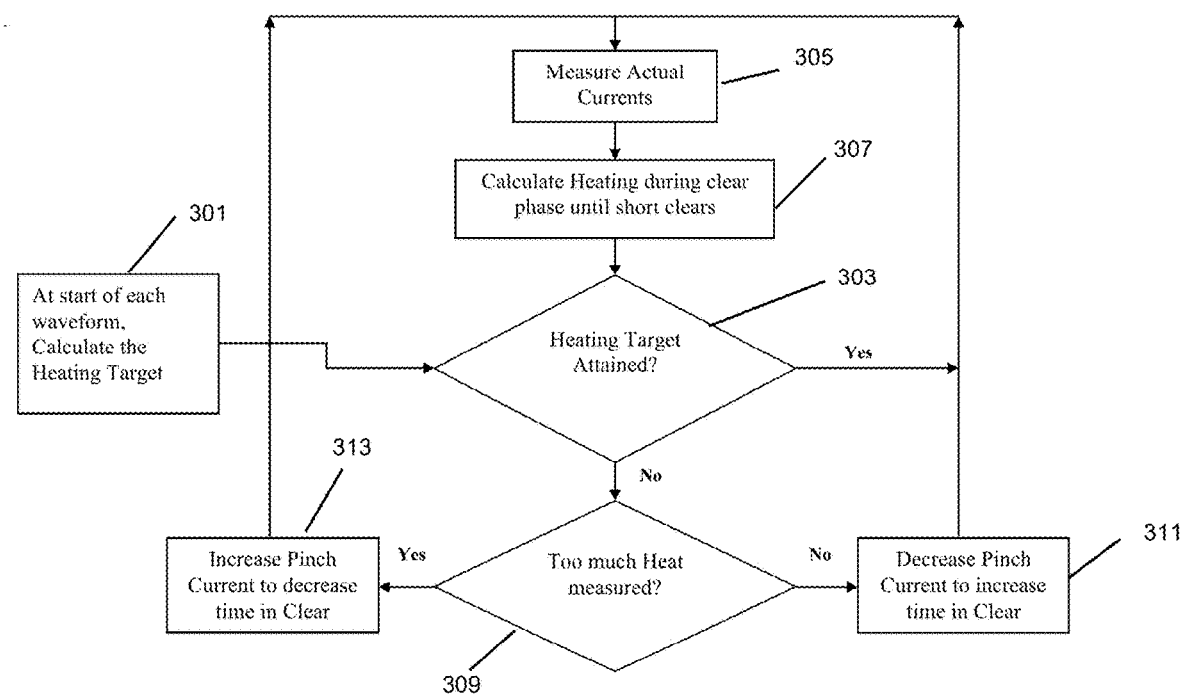
FIG. 3 is a flow chart implementing one aspect of the control of a short circuit process disclosed herein.

An algorithm implementing the preferred embodiment is illustrated in the flow chart of FIG. 3. At the start of each waveform a heat target is calculated at action 301. The target can be preset or based on prior cycles. This target is provided to comparator or decision point 303 for use in a comparison. The actual current is measured at action 305. The actual current is used in action 307 to calculate the actual heating, until the short clears. This calculation may be done using the equation above (Heating=Heating+Current*Current). Every 50 microseconds (the data acquisition rate) the accumulated heat in that waveform is updated by adding the Current*Current for that time period. This continues until the short clears, and the actual heating up to the short clearing has thus been calculated. Alternatives provide for calculating the actual using other methods.

At decision point 303 the actual heat is compared to the heat target. If the actual heat equals the heating target (either exactly or within a window) at comparator 303, then the process continues back to action 305. No change is made because the targeted heat was delivered. The process returns to action 305 to begin again for the next waveform.

If the actual heat was not the target heat, then at decision point 307 it is determined if the actual heats was insufficient or excessive. If the actual heat exceeds the target, then the pinch current (in future waveforms) is increased at action 313. If the actual heat does not exceed the target, then the pinch current (in future waveforms) is decreased at action 311.

The flow chart of FIG. 3 provides an algorithm used to adjust a particular short state parameter in a future short, in response to the current heat and a target. Alternatives include varying the pinch time, varying the pinch ramp, varying the clear ramp, varying the target current or heat for the clear, adding desired short time and varying any of the above alternatives, varying pre-short current (which changes the amount of power before the next short) and/or varying any of the arc phases. These parameters are varied or set to change the length of time until the short clears and/or the current when the short clears.

One embodiment that can be implemented with a slight modification to the flow chart of FIG. 3 includes setting a heat target for at least a portion of a short state in action point 301. Then, at action point 305 one or more output parameters (that can include or not include current) are monitored during the short state. A measured heat is calculated at action point 307 from the measured output parameters. The measured heat is compared to a heat target at decision point 303. One or more output parameters in at least one subsequent short state and/or at least one subsequent arc state are adjusted in response to the comparison of 303, and then the process repeats. In various alternatives the output parameter (s) adjusted are in a subsequent arc state and a subsequent short arc state, a subsequent arc state and not a subsequent short arc state, or a subsequent short state, and not a subsequent short arc state. In other alternatives the output parameter adjusted is output current magnitude.

Figure 4:
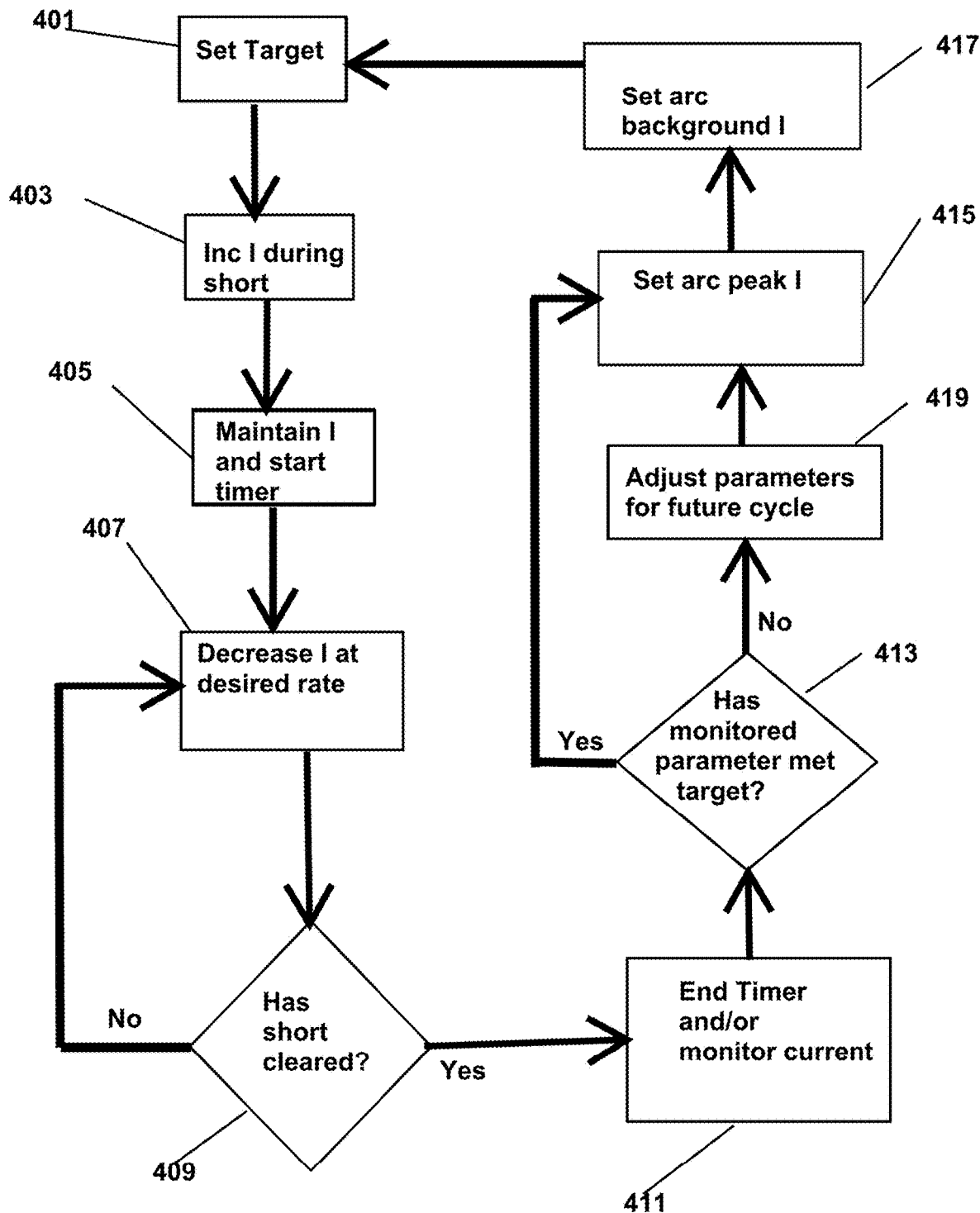
FIG. 4 is a flow chart implementing another aspect of the control of a short circuit process disclosed herein.

FIG. 4 is a flow chart for controlling a short circuit process waveform/cycle. Short circuit process, as used herein, is a welding process with the output alternating between an arc state and a short circuit state. A heating target is set at action point 401, in accordance with the flowchart of FIG. 3. The current is increased at action point 403 while the process is in the short state to a first short current magnitude. The increase corresponds to the transition from the wet phase to the pinch phase of FIG. 2. When the desired first short current magnitude (pinch magnitude) is reached the process can optionally maintain (or slightly change) that magnitude for a desired length of time (or desired amount of heat) at action point 405. A timer is started when the plateau begins or ends, or after the pinch current magnitude is reached. Alternatives provide for the timer to begin at other location in the waveform, or to monitor the current, or other parameters. Then, after the magnitude has been optionally held, or after the first short current magnitude has been reached, the current is decreased from the first short current magnitude at a first decrease rate at action point 407. The decrease continues until a desired current is reached, or until the process changes to the arc state. The end of the ramp corresponds to the transition from clear phase 205 to blink phase 207 in FIG. 2.

The short is monitored for clearing at decision point 409, such as by monitoring output voltage. When the short clears the timer started at action point 405 is terminated at action point 411 (or the magnitude of the current is noted). Thus, the timer records the elapsed time to the transition. Elapsed time to the transition, as used herein, refers to the time that elapses from some portion of the cycle, such as the start or end of the short or arc state, the start or end of the ball, pinch, etc. phase, the time at which current changes, etc., to some defined point in the transition from the short state to the arc state, such as the beginning, end, midpoint, a chosen current magnitude, etc.

The elapsed time (or current monitoring) obtains feedback of the time or current at the transition. A function of the monitored parameter is compared to a target at decision point 413. If the target is reached (either exactly or within a window) the process proceeds to increasing the current in the arc state to a peak arc current magnitude at action point 415. This corresponds to transitioning to ball phase 209 in FIG. 2. After the ball phase ends (in accordance with time or other desired parameters), the current is decreased to background current 211 at action point 417. The process then starts over at action point 401.

If, at decision point 413, the target is not reached, then one or more short state parameters and/or arc state parameters of a subsequent cycle are adjusted at action point 419. Short state parameters as used herein, refers to parameters of the commanded output when in the short state, such as current magnitude, peak current magnitude, rate of increase or decrease in the current magnitude, time in various phases (ball, pinch, etc) of the short state, and time in the short state.

The adjustment can be for parameters of the next cycle, or for one or more cycles farther into the future. The process then continues on to action point 415, to finish the present/current cycle. The adjustment of parameters for one or more subsequent cycles can be based solely on the present cycle, or based on other cycles that are before the cycle having parameters being adjusted. The adjusting is preferably done to effect a desired change in the subsequent short state transition current. Transition current, as used herein, refers to the current magnitude at which the output changes from a short state to an arc state.

One embodiment provides that action point 419 adjusts the arc state parameters of a subsequent arc state. Another embodiment provides that action point 419 adjusts the short state parameters of a subsequent short state.

The target used in decision point 413 can be any parameter, including those discussed above with respect to FIGS. 2 and 3. One embodiment provides that the target used in action point 413 is time based, and that the adjustment made by action point 419 includes decreasing the current at a second decrease rate, wherein the second decrease rate has a greater magnitude than the first decrease rate. If the target is not reached, the current is decreased even more rapidly in clear phase 205, so that a low current is reached prior to the clearing.

As discussed above decision point 413 compares a function of the monitored parameter to a target. That function can be a pass through function (direct comparison), but is preferably consistent with a PI control loop. One embodiment provides that the monitored parameter is current, and the function is heat (proportional to current squared), and the target or desired value is responsive to a desired heat provided during the at least part of the short state. Preferably, this embodiment includes (as the adjustment at action point 419) increasing the short state current magnitude to reduce the time and heat in the subsequent short state, and decreasing the short state current magnitude to increase the time and heat in the subsequent short state, depending on whether the actual heat was more or less than the target at decision point 413.

Figure 5:
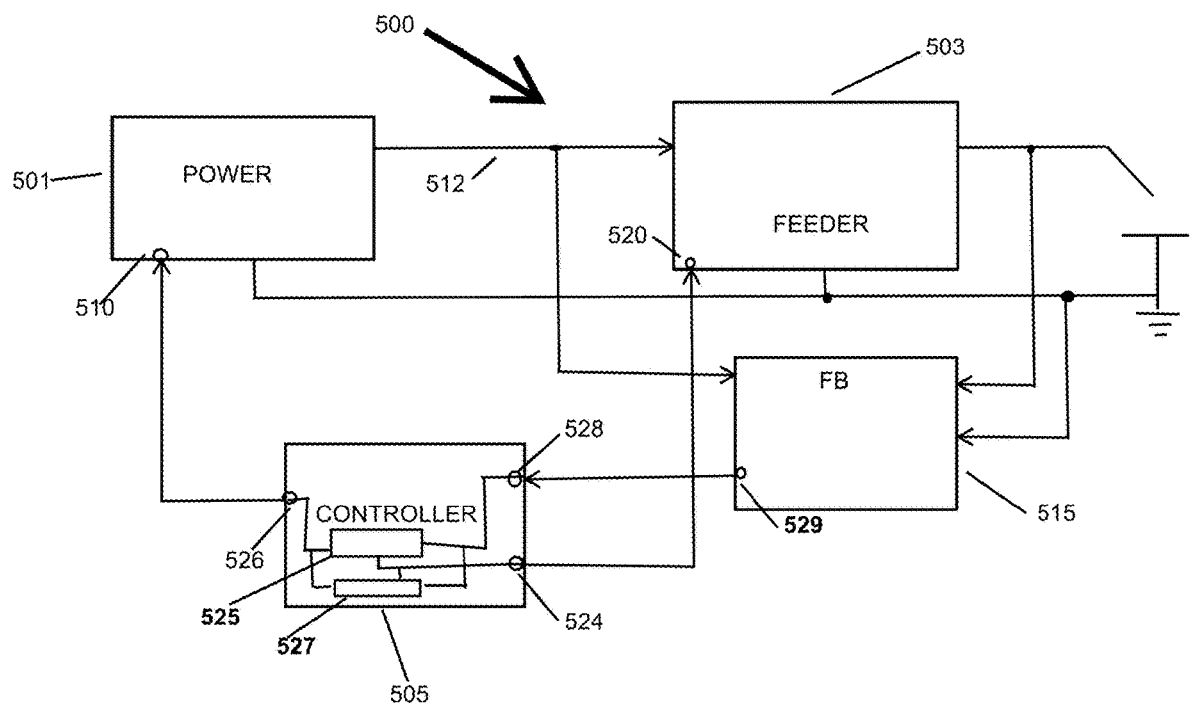
FIG. 5 is a diagram of a system for short circuit welding disclosed herein.

A short-circuit welding system 500 implementing the preferred embodiment is shown in FIG. 5 and includes a welding type power circuit 501, a wire feeder 503 (which can be part of power circuit 501) and a controller 505 cooperate to a welding output and wire to a welding arc. Short-circuit welding system, as used herein, refers to a welding system that includes a power circuit controlled to perform a short circuit process (possibly along with other welding processes). Welding output, as used herein, refers to an output of a power supply capable of being used to weld.

Power circuit 501 receives input power and can include an input circuit, one or more converters and/or transformers, and an output circuit. The output circuit provides a welding output. System 500 does not require a separate and distinct wire feeder. In the preferred embodiment wire feeder 503 receives the welding output power, and provides power to the arc via the wire. Power circuit 501 and wire feeder 503 can be in a single housing or in distinct housings. Alternatives provide that power is provided directly from power circuit 101 to the arc. Power circuit, as used herein, includes circuitry capable of supplying welding-type power including converters, resonant power supplies, quasi-resonant power supplies, etc., and ancillary circuitry associated therewith, and can include a wire feeder. Input circuit, as used herein, refers to circuits configured to receive input power and to provide intermediate power, and may include as part thereof components and circuits such as rectifiers, transformers, saturable reactor, converters, filters, and/or magnetic amplifiers.

A feedback circuit 515 is connected to the power circuit and provides a feedback responsive to one or more of output current, output voltage, arc/short state of the output, etc. Feedback, as used herein, includes a signal indicative of or responsive to an output or intermediate signal, which is provided to the controller and control decisions are made in response thereto. Feedback circuit, as used herein, includes a circuit that provides a signal indicative of or responsive to parameter or parameters of an output or intermediate signal, and provides a signal responsive to and indicative of the parameter or parameters, including functions thereof, and can include the hardware and software that calculates the functions and/or stores such values and functions.

Controller 505 controls power circuit 501, wire feeder 503 and feedback circuit 515. Controller or control circuit, as used herein, refers to digital and analog circuitry, discrete or integrated circuitry, microprocessors, DSPs, etc., software, hardware and firmware, located on one or more boards, that form part or all of a controller, and are used to control a welding process, a welding power circuit or a device such as a welding power source or wire feeder.

Generally, controller 505 includes control modules that control switches etc. in power circuit 501 and wire feeder 503 in response to feedback from feedback circuit 515 so that the output follows a desired waveform. Control module, as used herein, refers to a portion of a controller that may be digital, analog, hardware and/or software, that performs a specified control function. Except as described herein, controller 505 can control consistent with the prior art. The preferred embodiment provides that controller 505 causes the output to be that described in FIG. 2, and follows the algorithms of FIGS. 3 and 4. Alternatives provide using other algorithms and providing other waveforms. One alternative provides that system 505 is not a short circuit system, but the algorithms of FIGS. 3 and 4 are used to reduce current for an inadvertent short in other processes (pulse, for example).

Controller 505 can be disposed in a housing with power circuit 501, wire feeder 503 and/or feedback circuit 515, or it can be located elsewhere, such as in a robot or be part of a robot controller. Controller 505 has control outputs 526 and 524 connected to control inputs 510 on power circuit 501 and 520 on wire feeder 503. Control outputs 524 and 526, and control inputs 510 and 520 can each include one or more control signal on one or more control lines. Controller 505 also has a feedback input 528 connected to a feedback output 529 of feedback circuit 515. Wire feeder 503 includes a feed speed control input 520 that receives control signals from controller 505.

Controller 505 includes a short state module 525 that provides one or more short state parameters, and an arc state module 527 that provides one or more arc state parameters. These modules control the waveform during the respective states, preferably in accordance with the algorithms and waveforms discussed above with respect to FIGS. 2-4, and consistent with the prior art except as described herein. Aspects of short state module 525 are shown in more detail in FIG. 6.

Short state module, as used herein, refers to a control module that provides short state output parameters. Short state parameters, as used herein, refers to output parameters for the short state of a short-circuit process. Arc state module, as used herein, refers to a control module that provides arc state output parameters. Output parameter, as used herein, refers to one of output voltage, current, time in a phase, heat, power, etc, which can be used to describe the output waveform, and output parameters can be varying with time. Arc state parameters, as used herein, refers to output parameters for the arc state of a short-circuit process. Short state module 525 and arc state module 527 are preferably implemented using software, although they can be partially or completely implemented with hardware.

Figure 6:
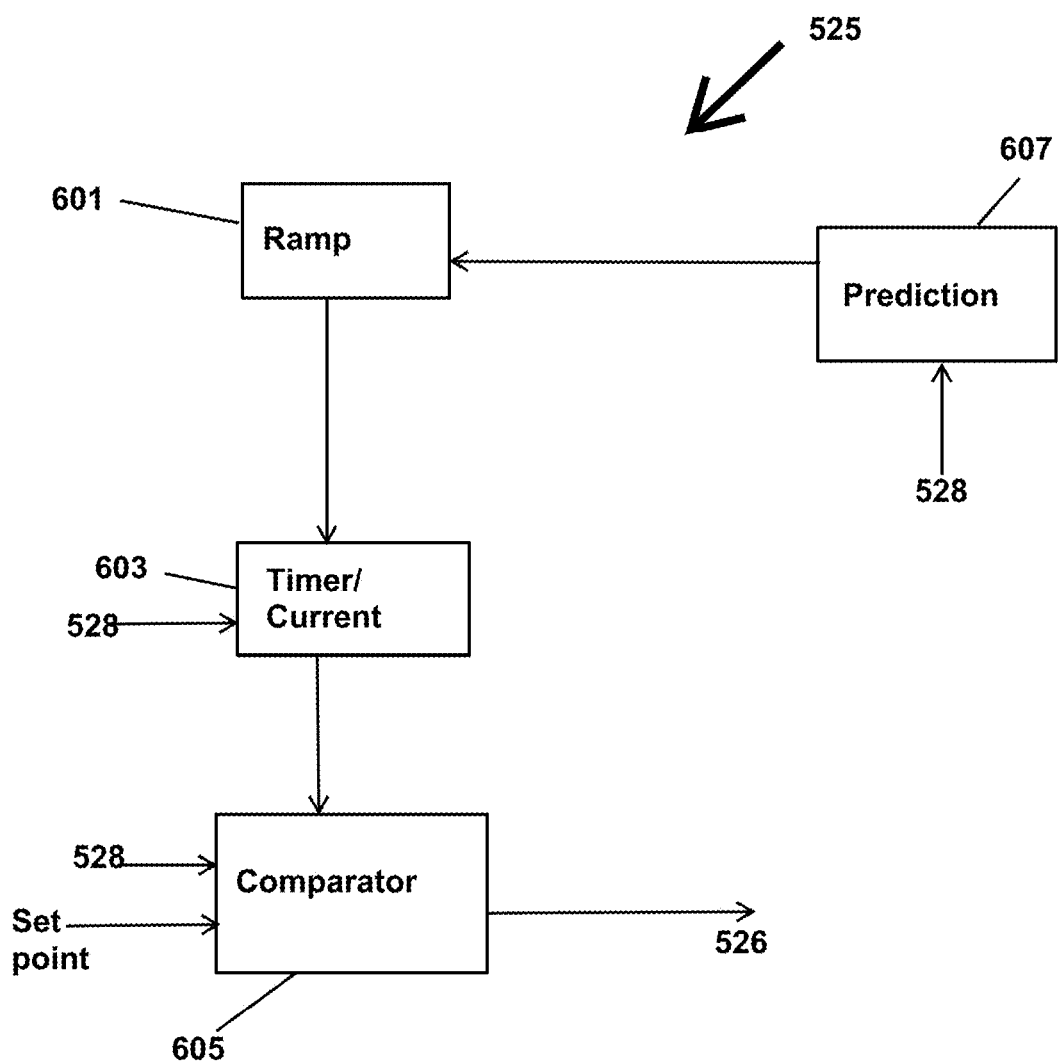
FIG. 6 is a diagram of a system for one module that sets output parameters disclosed herein.

Referring now to FIG. 6, short state module 525 includes a short state ramp module 601 that commands an increasing current while in the short state until the current reaches a first short current magnitude (plateau 203 in FIG. 2). Then short state ramp module 601 commands a current decreasing from the first short current magnitude at a first decrease rate (ramp 205 in FIG. 2), in response to at least one short state ramp module input. The input can be one of the parameters (in this case ramp rate) set to control heat, as described above. Short state ramp module, as used herein, refers to a control module that provides output parameters while the process is in a current ramp in the short state in response to one or more inputs to the short state ramp module. Short state ramp module 601 is preferably implemented using software, although it can be partially or completely implemented with hardware.

Short state module 525 also includes an elapsed time monitoring module 603 that monitors elapsed time to the transition and/or monitors the transition current. Elapsed time monitoring module as used herein, refers to a control module that monitors time elapsing between two events, such as the time from one portion of a cycle to another. The short state parameters are responsive to the elapsed time monitoring module in the preferred embodiment. Elapsed time monitoring module 603 is preferably implemented using software, although it can be partially or completely implemented with hardware.

Short state module 525 also includes a comparison module 605 that compares a function of the monitored elapsed time to the transition from module 603 and/or the transition current (or other parameters used to indicate heat) from input 528 to a desired value. One or more short state parameters for a subsequent short state are provided in response to the output of comparison module 528 to effect a desired change in the transition current of the subsequent short state. The function, in the preferred embodiment, is the time it takes for th short to clear and/or the current when the short clears, in accordance with the methods described above. Comparison module 605, also called a cooperator, is preferably implemented using software, although it can be partially or completely implemented with hardware. Comparison module, as used herein, refers to a control module that compares to values and provides a signal in response to that comparison, and may include analog hardware, hardware such as a cooperator, or digital commands implemented by a DSP, microprocessor, etc.

Short state module 525 also includes a transition prediction module 607 that also receives a signal from feedback circuit 515. An output of transition prediction module 607 is connected to provide a prediction output to the short state ramp module. This prediction is used in future cycles to predict when the transition should occur. Transition prediction module 607 is preferably implemented using software, although it can be partially or completely implemented with hardware. Transition prediction module, as used herein, refers to a control module that predicts when the transition from short state to arc state will occur.

Comparison module 605 receives as a first input a signal that is indicative of the heat provided during at least one phase of the short state in one embodiment. The signal can be from timer 603 or feedback circuit 515. Comparison module 605 also receives as a second input a signal indicative of a desired heat provided during the at least one phase of the short state. This can be a fixed set point, or one that changes based on the heat provided when the clear occurs in prior cycles. The input indicative of heat can be from a measured heat module.

Figure 7:
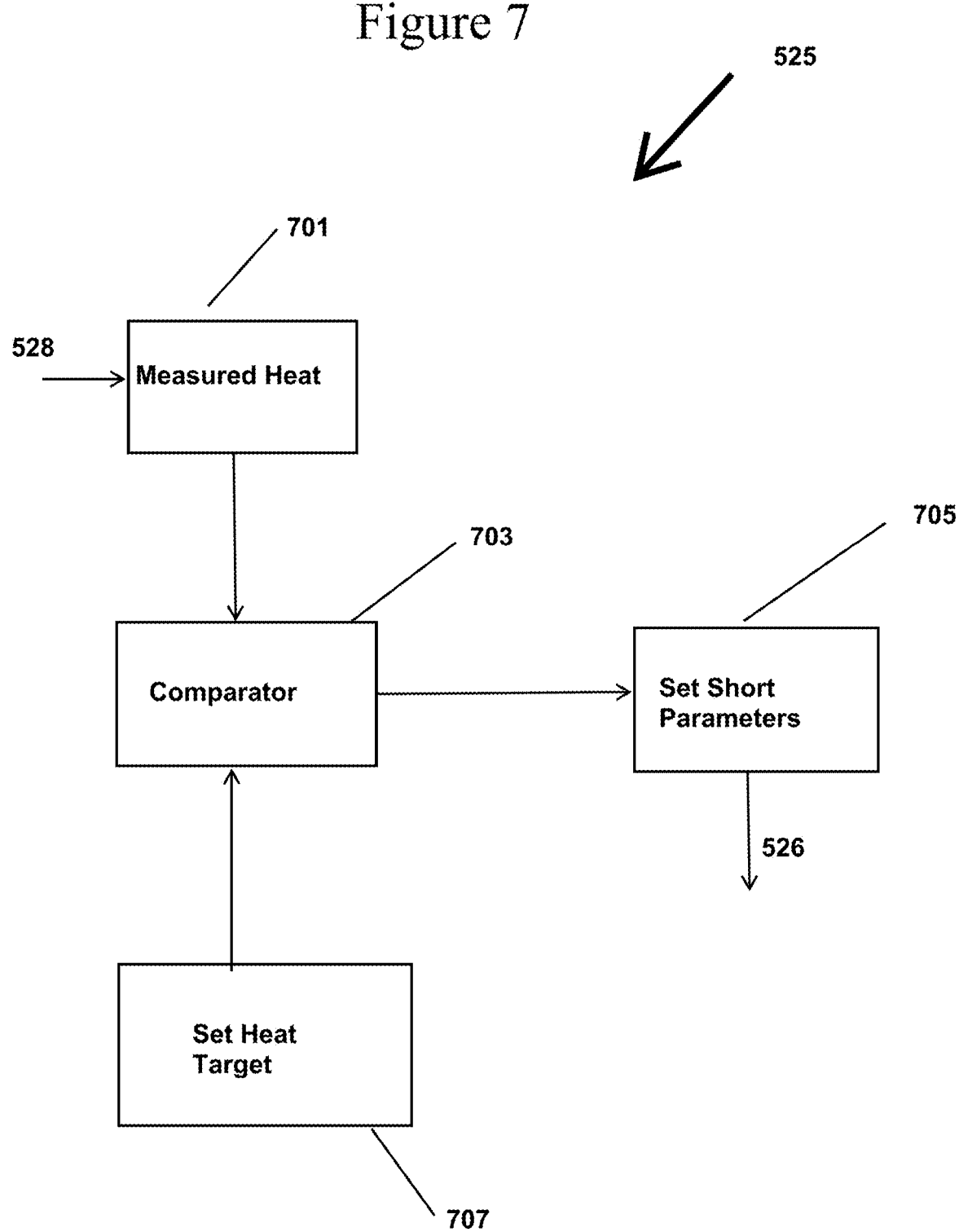
FIG. 7 is a diagram of a system for another module that sets output parameters disclosed herein.

Referring now to FIG. 7, an alternative embodiment of short state module 525 includes a measured heat module 701 that receives as an input feedback from input 528. In this embodiment the feedback includes output current (for heat calculation) and output voltage (for short/arc state determination, and possibly heat calculation). Measured heat module 701 calculates a measured heat output for at least a portion of the short state, as described above with respect to FIGS. 2-4. Measured heat module 701 is preferably implemented using software, although it can be partially or completely implemented with hardware. Measured heat module 701 preferably calculates heat using current squared, but can use other methods. Measured heat module, as used herein, refers to a control module that provides a signal responsive to the heat provided during at least a part of the short state and/or arc state.

Short state module 525 also includes a comparison module 703 (also called a cooperator) that compares a desired heat target and a function of the measured heat output from module 701. The comparison (and function) in the preferred embodiment is that described above with respect to FIGS. 2-4. Comparison module 703 is preferably implemented using software, although it can be partially or completely implemented with hardware. The target can be a fixed value, or one based on prior cycles.

Short state module 525 sets the short state parameters using a parameter module 705 which provides them on output 526. The short state parameters that are set are done so in response to the output of the comparison module, and can be done in response to one or process cycles prior to the one for which the parameters are set. In one embodiment a parameter module 705 adjusts the current magnitude of one phase of the subsequent short state in response to the comparison module. Parameter module 705 is preferably implemented using software, although it can be partially or completely implemented with hardware.

Short state module 525 includes, in one alternative, a heat setting module 707 that is active for at least a portion of a short state. Heat setting module 707 sets a heat target, which is provided to cooperator 703. The target can be preset, user set, process set, or adjusted in response to past process cycles. Heat setting module 707 is preferably implemented using software, although it can be implemented with hardware. Heat setting module, as used herein, refers to a control module that provides a signal indicative of a desired heat provided during at least a part of the short state and/or arc state.

Numerous modifications may be made to the present disclosure which still fall within the intended scope hereof. Thus, it should be apparent that there has been provided a method and apparatus for short arc welding that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A method of controlling a short circuit welding process having alternating short states and arc states, comprising:
   increasing the current while in the short state to a first short current magnitude;
   thereafter decreasing the current from the first short current magnitude at a first decrease rate;
   transitioning from the short state to the arc state at a transition current;
   monitoring at least one of an elapsed time to the transition and the transition current;
   comparing a function of at least one of the monitored elapsed time to the transition and the transition current to a desired value;
   increasing the current in the arc state to a peak arc current magnitude;
   decreasing the current in the arc state to a background current magnitude;
   adjusting at least one of short state parameters of a subsequent short state and arc state parameters of a subsequent arc state, based on at least one or more past comparings to effect a desired change in the subsequent short state transition current; and
   repeating these actions.

2. The method of claim 1, wherein adjusting at least one of short state parameters of a subsequent short state and arc state parameters of a subsequent arc state includes adjusting the arc state parameters of the subsequent arc state.

3. The method of claim 1, wherein adjusting at least one of short state parameters of a subsequent short state and arc state parameters of a subsequent arc state includes adjusting the short state parameters of the subsequent short state.

4. The method of claim 3, further comprising:
   predicting the transitioning based on feedback from the output; and
   in response to the predicting decreasing the current at a second decrease rate, wherein the second decrease rate has a greater magnitude than the first decrease rate.

5. The method of claim 4, wherein the function is responsive to the heat provided during at least one phase of the short state, and wherein the desired value is responsive to a desired heat provided during the at least one phase of the short state.

6. The method of claim 5, wherein adjusting short state parameters of the subsequent short state includes at least one of increasing a short state current magnitude to reduce the time and heat in the subsequent short state, and decreasing the short state current magnitude to increase the time and heat in the subsequent short state.

7. A short-circuit welding system for providing a welding output comprised of a plurality of alternating short states and arc states, wherein a current magnitude at which the output changes from a short state to an arc state is the transition current, comprising:
- a power circuit, disposed to receive power and provide a welding output, and having a control input;
- a feedback circuit, connected to the power circuit and having a feedback output responsive to at least output current and output voltage; and
- a controller, having control outputs connected to the control input, and having a feedback input connected to the feedback output, wherein the controller includes a short state module providing a plurality of short state parameters, and an arc state module providing a plurality of arc state parameters,
  - wherein the short state module includes a short state ramp module that commands an increasing current while in the short state until the current reaches a first short current magnitude, and wherein the short state ramp module thereafter commands a decreasing current from the first short current magnitude at a first decrease rate, in response to at least one short state ramp module input,
  - wherein the short state module includes an elapsed time monitoring module that monitors at least one of an elapsed time to the transition and the transition current, and the plurality of short state parameters are responsive to the elapsed time monitoring module,
  - wherein the short state module includes a comparison module that compares a function of at least one of the monitored elapsed time to the transition and the transition current to a desired value, and
  - wherein the short state module provides the plurality of short state parameters of a subsequent short state in response to the output of the comparison module from at least one past short state to effect a desired change in the transition current of the subsequent short state.

8. The system of claim 7, further comprising a transition prediction module that receives a signal from the feedback circuit and has an output connected to provide a prediction output to the short state ramp module input.

9. The system of claim 7, wherein the comparison module receives as a first input a signal that is indicative of the heat provided during at least one phase of the short state, and wherein the comparison module receives as a second input a signal indicative of a desired heat during the at least one phase of the short state.

10. A method of controlling a short circuit welding process, comprising:

setting a heat target for at least a portion of a short state;
monitoring output parameters during the short state;
calculating a measured heat from the measured output parameters;
comparing the measured heat and the heat target;
adjusting an output parameter in at least one of a subsequent short state and a subsequent arc state in response to at least one comparing from at least one previous short state; and
repeating these actions.

11. The method of claim 10, wherein adjusting an output parameter includes adjusting an output parameter in a subsequent arc state.

12. The method of claim 10, wherein adjusting an output parameter includes adjusting an output parameter in a subsequent short state.

13. The method of claim 12, wherein adjusting an output parameter includes adjusting a current magnitude in the subsequent short state.

14. A system for short circuit welding process, comprising:
- a power circuit, disposed to receive a power signal and provide a welding output, and having a control input;
- a feedback circuit, connected to the power circuit and having a feedback output responsive to at least output current and output voltage during the short state;
- a controller, having control outputs connected to the control input, and having a feedback input connected to the feedback output, wherein the controller includes a short state module providing a plurality of short state parameters, and an arc state module providing a plurality of arc state parameters,
  - wherein the short state module includes a measured heat module that receives as an input the feedback output and provides a measured heat output of at least a portion of the short state;
  - wherein the short state module includes a comparison module that compares a desired heat target and a function of the measured heat output; and
  - wherein the short state module provides the plurality of short state parameters of a subsequent short state in response to the output of the comparison module from at least one past short state.

15. The system of claim 14, further comprising a heat setting module active for at least a portion of a short state.

16. The system of claim 15, wherein a current magnitude in the subsequent short state is responsive to the comparison module.

* * * * *